Nov. 10, 1970   W. D. WARDLE   3,539,912
PORTABLE TEST UNIT FOR A NON-CONTACTING PICKUP UTILIZING
A ROTATING SWASH SURFACE AND MEANS TO ADJUST THE
PICKUP RELATIVE THERETO
Filed April 30, 1969

INVENTOR.
WILLIAM D. WARDLE
BY
George E. Manias
AGENT

United States Patent Office 3,539,912
Patented Nov. 10, 1970

3,539,912
PORTABLE TEST UNIT FOR A NON-CONTACTING PICKUP UTILIZING A ROTATING SWASH SURFACE AND MEANS TO ADJUST THE PICKUP RELATIVE THERETO
William D. Wardle, Columbus, Ohio, assignor to International Research and Development Corporation, Worthington, Ohio, a corporation of Ohio
Filed Apr. 30, 1969, Ser. No. 820,389
Int. Cl. G01r 35/00
U.S. Cl. 324—34                                         3 Claims

ABSTRACT OF THE DISCLOSURE

A portable test unit for field testing and calibrating non-contact pickups. Such test units include a rotatable swash-surface. The present invention provides means for adjusting a pickup to position the sensing tip thereof accurately relative to the swash-surface.

BACKGROUND OF THE INVENTION

Field of the invention

This invention relates to portable test units for field testing non-contact pickups.

Description of the prior art

Portable test units are available for field testing non-contact pickups to determine their output characteristics. Such test units include a static test assembly and a dynamic test assembly.

In the dynamic test assembly, the pickup is supported vertically with its sensing tip spaced-apart from the swash-surface of a rotatable subjacent plate member. When the plate member is rotated, the swash-surface simulates a vibrating metallic body wherein the magnitude of vibration is known. The magnitude of vertical displacements of the swash-surface varies from a maximum at the rim to zero at the center. The location of a pickup tip along the diameter determines the precise displacement between zero and the maximum value. Prior art test units include horizontal adjustment means for moving the pickup transversely to position the sensing tip at a selected location along a radius of the swash-surface.

The vertical displacements of the rotating swash-surface are sensed by the pickup which, in turn, produces a sinusoidal output voltage. To determine the pickup sensitivity, the gap distance between the sensing tip and the swash-surface is adjusted until the average output voltage of the pickup equals the static output voltage for the desired gap distance. In the prior art test units, such adjustment has been laboriously accomplished by manually raising and lowering the pickup.

SUMMARY OF THE INVENTION

The principal object of this invention is to provide an improved portable test unit for field testing non-contact pickups.

Another object of this invention is to provide an improved portable test unit of the type described wherein the sensing tip of the pickup being tested may be readily and accurately positioned at a known static gap distance from the swash-surface.

Still another object of this invention is to provide a portable test unit by which non-contact pickups may be accurately calibrated in the field.

The present invention provides an improved portable test unit for field testing and calibrating non-contact pickups. The present improvement resides in the dynamic test assembly which includes a plate member having a swash-surface and a rotation axis. The swash-surface is inclined relative to a reference plane extending normal to the rotation axis. The reference plane intersects the swash-surface along a line which intersects the rotation axis. Means is provided for supporting the plate member for rotation about the rotation axis. Mounting means supports a non-contact pickup with the sensing tip thereof spaced-apart from the swash-surface. Transverse adjustment means permits moving the means transversely to position the sensing tip accurately at a selected location along a radius of the swash-surface. Drive means including speed adjustment means is provided for rotating the plate member at a selected velocity.

In accordance with the present invention, gap distance adjustment means is provided for moving the pickup parallel to the rotation axis to position the sensing tip thereof accurately at a predetermined distance from the reference plane. In the preferred arrangement, the gap distance adjustment means is interposed between the mounting means and the transverse adjustment means whereby the pickup and the mounting means are moved as a unit.

DESCRIPTION OF THE PREFERRED EMBODIMENTS

Figure 1:
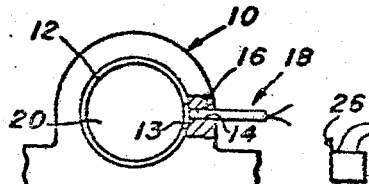
FIG. 1 is an end view, partly in cross-section, schematically illustrating the manner in which a non-contact pickup is mounted in relation to one type of rotating body.
Figure 2:
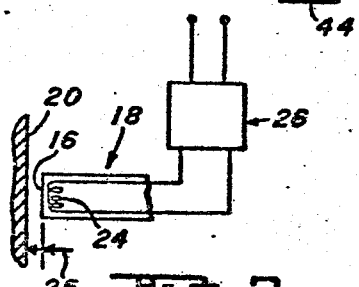
FIG. 2 is a schematic illustration of a non-contact pickup and an oscillator circuit associated therewith.

FIGS. 1 and 2 are provided to set forth the nature of non-contact pickups and their typical uses.

FIG. 1 illustrates a bearing housing 10 provided with an interior bronze bushing 12, having a bushing opening 13. The side wall of the bearing housing 10 is provided with an opening 14 communicating with the bushing opening 13. The conductive pickup head or sensing tip 16 of a non-contact pickup 18 is introduced into the opening 14 and is secured to the bearing housing 10 by means not shown. A shaft 20 is rotatably supported by the bushing 12. When the shaft 20 rotates, it may wobble within the bushing 12 as a result of mass eccentricity, shaft misalignment, worn bearings and other reasons. The pickup 18 is intended to detect movement of the shaft 20 relative to the sensing tip 16.

FIG. 2 illustrates a typical pickup. The sensing tip 16 includes a coil 24 connected to an oscillator 26. The arrangement is such that the coil 24 is an inductive component of the tank circuit of the oscillator 26. The output of the oscillator 26 varies according to the proximity of the coil 24 and the surface of the shaft 20.

The rotating shaft moves cyclically toward and away from the sensing tip 16. The output signal from the oscillator 26 varies in a corresponding cyclic manner. The output oscillations may be demodulated to provide a cyclic vibration signal having a frequency corresponding to the frequency of the shaft rotation and an amplitude which varies as a function of the peak-to-peak displacement of the shaft.

Each pickup develops a characteristic output voltage per unit of displacement at a known static gap distance.

A portable test unit 26 for testing non-contact pickups is in the field as illustrated in FIGS. 3–6, inclusive. The test unit 26 includes static and dynamic test assemblies 28, 30. The test unit 26 includes an enclosure 32 having a lid (not shown) and interior partitions 34 supporting a top wall 36.

STATIC TEST ASSEMBLY

Figure 3:
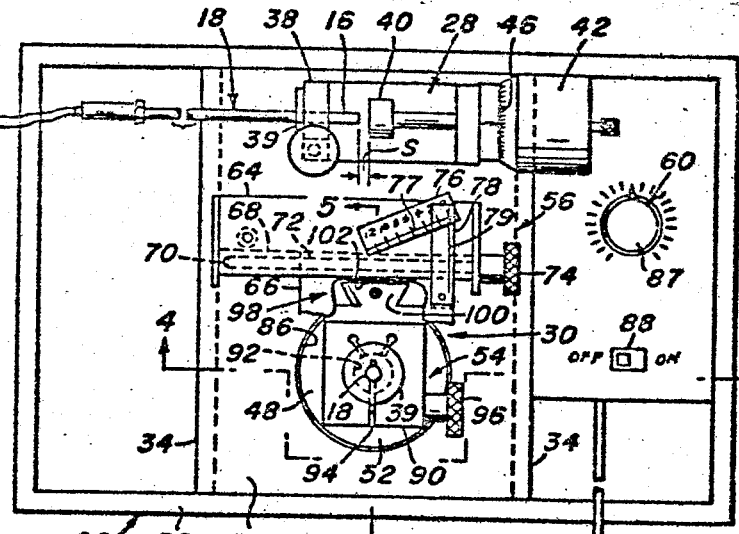
FIG. 3 is a plan view of a portable test unit incorporating the gap distance adjustment of this invention.

Referring to FIG. 3, the static test assembly 28 typically comprises a support 38 adapted to receive a split body adaptor bushing 39 carrying the pickup 18. The sensing tip 16 is positioned opposite a metal pad 40 of a micrometer 42. The pickup 18 is connected through the oscillator 26 to a voltmeter 44 of the type capable of reading direct current and alternating current voltages. The static gap output voltage $V_o$—the direct current component of the output signal—as indicated by the voltmeter 44 is noted at one or more static gap distances S which are observed from the scale 46 of the micrometer 42.

DYNAMIC TEST ASSEMBLY

Referring to FIGS. 3–6, the dynamic test assembly 30 typically comprises, in general, a plate member 48 having a vertical axis 50 and swash-surface 52; carrier means 54 for supporting the pickup 18 above the swash-surface 52; horizontal adjustment means 56 for moving the carrier means 54 horizontally to position the sensing tip 16 of the pickup 18 accurately at a selected location along a radius (not visible) of the swash-surface 52; and drive means 58 including speed adjustment means 60 for rotating plate member 48 at a selected velocity.

Figure 6:
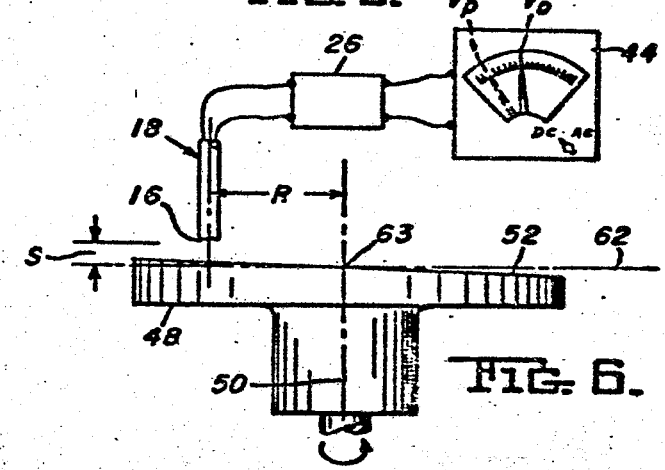
FIG. 6 is a side view of a rotatable plate member, schematically illustrating the position of the pickup relative to the swash-surface of the plate member.

Referring to FIG. 6, the swash-surface 52 is inclined relative to a reference plane 62 extending normal to the vertical axis 50. The swash-surface 52 intersects the reference plane 62 along a line 63 (normal to the plane of the drawing) which intersects the vertical axis 50. The overall arrangement is such that as the plate member 48 is rotated, that region of the swash-surface 52 directly beneath the sensing tip 16 approaches toward and recedes from the sensing tip 16 to simulate a vibrating metallic body. At any distance R from the vertical axis 50, the amount of vertical displacement of the swash-surface 52 directly beneath the sensing tip 16 is known.

Figure 5:
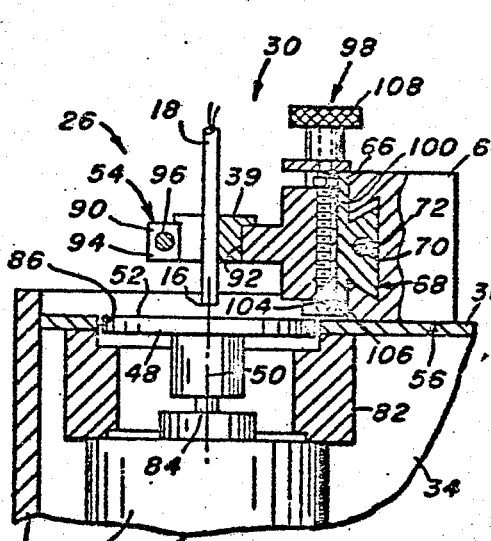
FIG. 5 is a cross-sectional view taken along the line 5—5 of FIG. 3.
Figure 4:
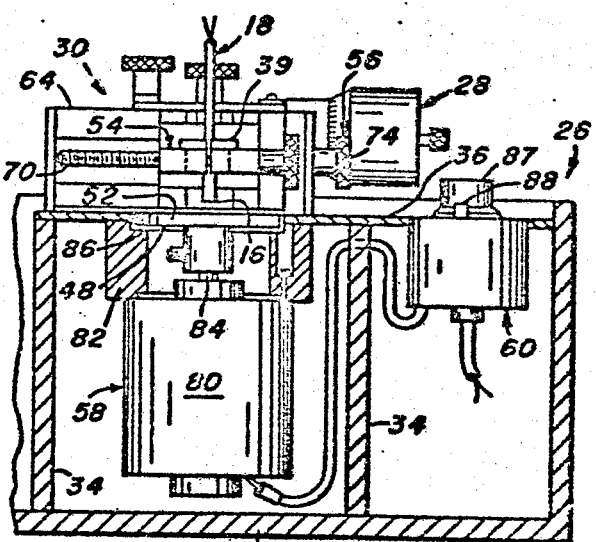
FIG. 4 is a cross-section view taken along the line 4—4 of FIG. 3.

Referring to FIGS. 3–5, the horizontal adjustment means 56 comprises a stationary block 64 and a mounting block 66 connected to the stationary block 64 by a dovetail slide connection 68. A threaded shaft 70 is engaged in a threaded bore 72 provided in the mounting block 66. The shaft 70 is rotated by a knob 74 secured thereto.

Referring to FIG. 3, the upper surface of the stationary block 64 is provided with a plate 76 having a graduated displacement scale 77. The top surface of a mounting block 66 is provided with transparent plate 78 having an indicator line 79. The scale 77 and indicator line 79 cooperate to indicate the amount of vertical displacement of the swash-surface 52 above and below the reference plane 62 (FIG. 6), at selected distances R from the vertical axis 50.

The drive means 58 comprises a high speed electric motor 80 supported below the top wall 36 by a mounting ring 82. The plate member 48 is secured to a drive shaft 84 of the motor 80 and is thereby supported for rotation about the vertical axis 50. The plate member 48 resides within an opening 86 formed in the top wall 36 and is presented opposite to the sensing tip 16 of the pickup 18. The speed control means 60 includes a speed indicator knob 87 and an on-off switch 88.

PRESENT INVENTION

The present improvement resides in gap distance adjustment means for moving the pickup 18 vertically to position the sensing tip 16 thereof accurately at a predetermined distance from the reference plane 62.

Referring to FIGS. 3 and 5, the carrier means 54 comprises an arm 90 having a central opening 92 receiving the split body adapter bushing 39. The arm 90 has a slot 94 and a clamping screw 96 which cooperate to frictionally clamp the adapter bushing 39 within the central opening 92.

The arm 90 is connected to the mounting block 66 by the gap distance adjustment means 98 of this invention. As best shown in FIG. 3, the gap distance adjustment means 98 comprises a dovetail rib 100 formed in the arm 90 and a complementary groove 102 formed in the mounting block 66. As best shown in FIG. 5, a threaded shaft 104 is engaged in a threaded bore 106 provided in the rib 100. The threaded shaft 104 is rotated by a knob 108 secured thereto.

OPERATION

Referring to FIGS. 5 and 6, the output voltage of the pickup 18 per unit of displacement of the swash-surface 52 at a known gap distance S can be accurately determined as follows. The arm 90 is moved horizontally by rotation of the knob 74 to position the pickup 18 at a selected position, as indicated by the graduated displacement scale 77 and the indicator line 79, relative to the swash-surface 52. The plate member is rotated at a selected speed. With the voltmeter switch in the D.C. position, the D.C. value of the output voltage of the pickup 18 is indicated on the voltmeter 44. The knob 108 of the vertical adjustment means 98 is rotated in the appropriate direction to raise or lower the pickup 18 until the voltmeter 44 indicates a D.C. output voltage $V_o$ corresponding to the known gap distance S. While the plate member 48 is rotating, the voltmeter 44 is switched to A.C. and indicates the peak-to-peak voltage designated $V_p$ (FIG. 6). The peak-to-peak voltage $V_p$ is divided by the deviation of the swash-surface 52 to determine the desired output voltage per unit of displacement from the static gap distance S. This operation may be repeated at other static gap distances.

The gap distance adjustment means 98 of this invention permits accurate placement of the sensing tip of a pickup at a desired static gap distance. The output voltage characteristic of the pickup thus may be accurately determined at a known static gap distance.

I claim:

1. In a test unit for non-contact pickups, said test unit comprising a plate member having a rotation axis and a swash-surface which is inclined relative to a reference plane extending normal to said rotation axis; said reference plane intersecting said swash-surface along a line which intersects said rotation axis; means for supporting said plate member for rotation about said rotation axis; a non-contact pickup having a sensing tip; mounting means supporting said non-contact pickup spaced-apart from said swash-surface; transverse adjustment means supporting said mounting means for movement transversely to position said sensing tip accurately at a selected location along a radius of said swash-surface; and drive means for rotating said plate member; the improvement comprising:

gap distance adjustment means for moving said pickup parallel to said rotation axis to position said sensing tip accurately at a predetermined distance from said reference plane.

2. The improvement defined in claim 1 wherein said gap distance adjustment means is interposed between said mounting means and said transverse adjustment means whereby said pickup and said mounting means are moved as a unit.

3. The improvement defined in claim 1 wherein said gap distance adjustment means comprises a threaded shaft carried by said transverse adjustment means and threadily engaged with said mounting means, said threaded shaft extending parallel with said rotation axis.

References Cited

UNITED STATES PATENTS 3,249,744  5/1966  Anstey et al. _____ 307—

RUDOLPH V. ROLINEC, Primary Examiner
R. J. CORCORAN, Assistant Examiner

U.S. Cl. X.R.

73—1, 71.4; 307—106; 323—90